US008368013B2

(12) United States Patent
Ishimaru et al.

(10) Patent No.: US 8,368,013 B2
(45) Date of Patent: Feb. 5, 2013

(54) ANALYZER, IONIZATION APPARATUS AND ANALYZING METHOD

(75) Inventors: Masako Ishimaru, Tokyo (JP); Yuichiro Hashimoto, Tachikawa (JP); Hideki Hasegawa, Tachikawa (JP); Masuyoshi Yamada, Ichikawa (JP); Masuyuki Sugiyama, Hino (JP); Hidetoshi Morokuma, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 112 days.

(21) Appl. No.: 13/084,930

(22) Filed: Apr. 12, 2011

(65) Prior Publication Data

US 2011/0253889 A1 Oct. 20, 2011

(30) Foreign Application Priority Data

Apr. 19, 2010 (JP) ................................ 2010-095619

(51) Int. Cl.
*B01D 59/44* (2006.01)
*H01J 49/00* (2006.01)

(52) U.S. Cl. ......................... 250/288; 250/282; 250/281

(58) Field of Classification Search .................. 250/281, 250/282, 283, 288, 423 R
See application file for complete search history.

(56) References Cited

U.S. PATENT DOCUMENTS

| | | | | | |
|---|---|---|---|---|---|
| 3,617,459 | A | * | 11/1971 | Logan | 204/192.23 |
| 3,755,123 | A | * | 8/1973 | Davidse et al. | 204/192.15 |
| 4,410,407 | A | * | 10/1983 | Macaulay | 204/192.25 |
| 4,450,062 | A | * | 5/1984 | Macaulay | 204/298.11 |
| 5,306,412 | A | | 4/1994 | Whitehouse et al. | |
| 5,753,910 | A | * | 5/1998 | Gourley et al. | 250/288 |
| 6,768,119 | B2 | * | 7/2004 | de la Mora et al. | 250/423 R |
| 7,064,320 | B2 | | 6/2006 | Yamada et al. | |
| 7,569,812 | B1 | * | 8/2009 | Karpetsky et al. | 250/282 |
| 7,952,069 | B2 | * | 5/2011 | Shiokawa et al. | 250/282 |
| 2005/0145789 | A1 | * | 7/2005 | Miller et al. | 250/290 |
| 2007/0084999 | A1 | * | 4/2007 | Miller et al. | 250/288 |
| 2008/0179033 | A1 | * | 7/2008 | Forbes Jones | 164/46 |
| 2009/0032695 | A1 | * | 2/2009 | Kaye et al. | 250/281 |
| 2009/0272894 | A1 | * | 11/2009 | Shiokawa et al. | 250/282 |
| 2010/0032559 | A1 | * | 2/2010 | Lopez-Avila et al. | 250/282 |
| 2012/0112061 | A1 | * | 5/2012 | Morokuma et al. | 250/288 |

FOREIGN PATENT DOCUMENTS

| | | | |
|---|---|---|---|
| WO | 2007/097023 | A1 | 8/2007 |
| WO | 2009/102766 | A1 | 8/2009 |

* cited by examiner

*Primary Examiner* — Nikita Wells
*Assistant Examiner* — Johnnie L Smith
(74) *Attorney, Agent, or Firm* — Mattingly & Malur, PC

(57) ABSTRACT

An analyzer performs dielectric barrier discharge and ionization of a sample by a reaction between the sample and excited molecules or ions generated by the dielectric barrier discharge at a pressure lower than an atmospheric pressure.

26 Claims, 10 Drawing Sheets

ANALYZER, IONIZATION APPARATUS AND ANALYZING METHOD

INCORPORATION BY REFERENCE

The present application claims priority from Japanese application JP-2010-095619 filed on Apr. 19, 2010, the content of which is hereby incorporated by reference into this application.

BACKGROUND OF THE INVENTION

The present invention relates to a mass analyzer and an operation method thereof.

An apparatus that simply measures a minute amount of substance contained in a mixed sample with high sensitivity extemporarily is demanded during measurement of a pollution of soil or air, agricultural chemicals inspection of foods, or diagnosis using metabolites in blood. As one of the methods capable of measuring a minute amount of substance with high sensitivity, a mass spectrometry is used.

In the mass spectrometry, substances are decomposed into ions of a vapor phase in an ion source, and they are introduced into a vacuum part to perform a mass separation. For performing the mass spectrometry with high sensitivity, an improvement in the sensitivity based on an improvement in performance of an ion source is important in addition to a modification of a mass analyzer part or detector.

Some of the ion sources applicable to a sample that is solid phase extracted from a solid or liquid sample, or a liquid or gas sample are known.

An old-traditionally used method is an electron impact ionization. This is a way in which a sample is vaporized by heat to become a sample gas and an electron beam is irradiated onto the sample gas under vacuum for ionization. Since high energy is used in the electron impact ionization, fragmentation in which a sample molecular structure is broken is easy to occur. The electron impact ionization is used for estimating an unknown sample from a spectrum pattern.

As an ionization method in which the fragmentation is small, an atmospheric pressure chemical ionization is used (U.S. Pat. No. 7,064,320). This is a way in which a sample is vaporized by heat to become a sample gas, and it is mixed with reagent ions generated by corona discharge under atmospheric pressure and ionized by an ion molecular reaction. Further, as a method having ionization efficiency higher than that of the atmospheric pressure chemical ionization, a dielectric barrier discharge ionization is known recently (WO 2009/102766). In the dielectric barrier discharge ionization, dielectric is sandwiched between electrodes so that a temperature of neutral gas or ions in plasma can be prevented from rising up and plasma with a low temperature can be generated. Excited molecules or ions are generated by the plasma and reacted with a sample gas, and sample ions are generated. A large amount of excited molecules or ions are generated in the dielectric barrier discharge, and the ionization efficiency is high. In WO 2009/102766, plasma ejected from a probe in an atmospheric air is directly applied to samples to be ionized and the generated ions are introduced into a mass analyzer.

As an ionization method in which the fragmentation is small and a sample fails to be heated, an electrospray ionization is used (U.S. Pat. No. 5,306,412). This is a way in which an electrolyte solution containing samples is sprayed under atmospheric pressure while applying a high voltage to that solution to thereby ionize them. Further, the above-described ionization method also includes a matrix assisted laser ionization (WO 2007/097023). This is a way in which laser light is irradiated onto a sample mixed with a matrix chemical under vacuum and the sample is ionized.

SUMMARY OF THE INVENTION

In the electron impact ionization, a spectrum becomes complicated due to the fragmentation of samples, and a simultaneous measurement of a plurality of components as in the measurement of mixture samples is difficult.

In the atmospheric pressure chemical ionization disclosed in U.S. Pat. No. 7,064,320, sample ions generated under atmospheric pressure are introduced into a vacuum part through an orifice or capillary. Therefore, when passing through the orifice or capillary, the sample ions are lost. Also, since a density of charged particles in the corona discharge used by the atmospheric pressure chemical ionization is low, the number of the generated ions is small.

In the dielectric barrier discharge ionization under atmospheric pressure disclosed in WO 2009/102766, since a density of charged particles is high, a large number of ions are generated. However, in the same manner as in the case of ion source of the atmospheric pressure chemical ionization, loss of ions occurs at the time when the generated sample ions are introduced into a vacuum part through an orifice or capillary, and therefore sensitivity is reduced.

A sample that is solid phase extracted from a solid or liquid sample, or a liquid or gas sample is heated and evaporated into a sample gas for ionization under atmospheric pressure. At this time, the solid or liquid has a low vapor pressure and is required to be heated at a high temperature, and therefore sample molecules cause thermal decomposition. Further, since it is heated at a high temperature, a large amount of power is consumed. In addition, when introduced into an ion source, the sample gas is adsorbed to a piping surface to be lost.

In the electrospray ionization disclosed in U.S. Pat. No. 5,306,412, even a substance with extremely low vapor pressure such as an ionic material is not heated, but can be ionized, however, an operation that a sample is mixed with an electrospray solvent is required, and therefore it lacks convenience. In addition, in the same manner as in the case of ion source of the atmospheric pressure chemical ionization, loss of ions occurs at the time when the generated sample ions are introduced into a vacuum part through an orifice or capillary, and therefore sensitivity is reduced.

In the matrix assisted laser ionization disclosed in WO2007/097023, an operation for mixing a sample with a matrix is required, and therefore it lacks convenience. In addition, a laser source is required, and therefore the apparatus becomes complicated and large-size.

To solve the above-described problem, in the present invention, a mass analyzer has a configuration in which dielectric barrier discharge and ionization of samples based on a reaction between the samples and excited molecules or ions generated by the dielectric barrier discharge are performed at a pressure lower than an atmospheric pressure. When the dielectric barrier discharge is performed at a pressure lower than an atmospheric pressure, the mass analyzer reduces a loss rate at the time when the generated sample ions are introduced into a vacuum part through an orifice or capillary, and raises up sensitivity.

According to the present invention, a mass analyzer can simply measure a sample with high sensitivity.

Other objects, features and advantages of the invention will become apparent from the following description of the embodiments of the invention taken in conjunction with the accompanying drawings.

DESCRIPTION OF THE EMBODIMENTS

First Embodiment

Shape of Ionization Chamber, and Sample Heating

Figure 1:
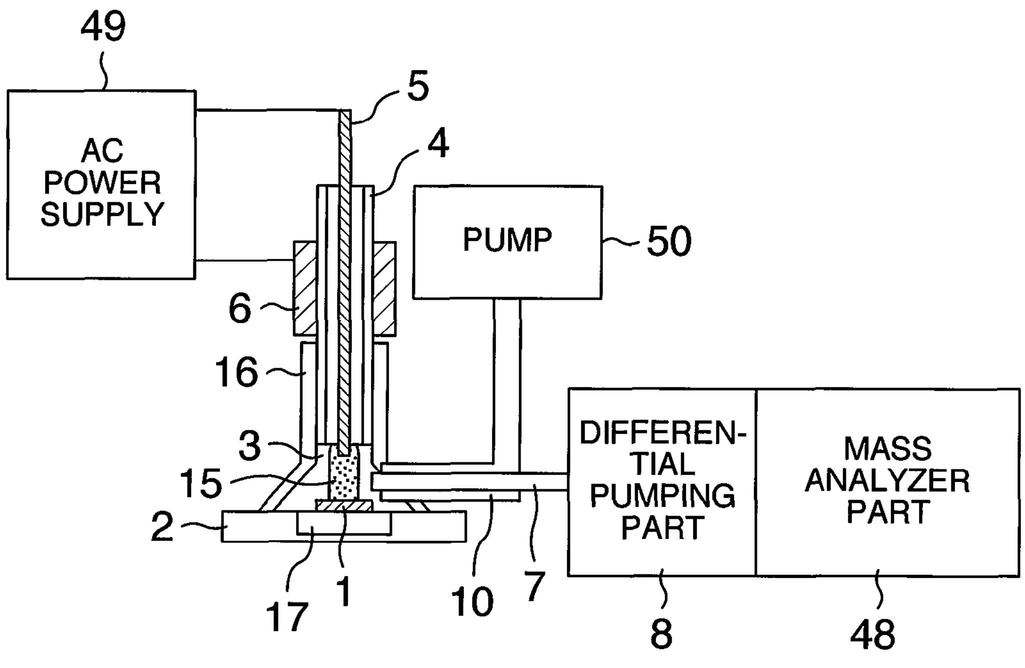
FIG. 1 illustrates a configuration example of a mass analyzer according to a first embodiment of the present invention.

FIG. 1 illustrates one configuration example of a mass analyzer according to a first embodiment of the present invention.

An ionization chamber wall 16 has a conical shape. FIG. 1 is a cross sectional view illustrating an ionization chamber. The above-described ionization chamber can reduce a volume of the ionization chamber and shorten the time for evacuation by using a pump, as compared with that having a rectangular parallelepiped. Further, the ionization chamber can keep sample ions in a high concentration while suppressing diffusion of them and improve sensitivity.

In a sample stage 2, a heater 17 is included and can heat a sample 1. When a vapor pressure of the sample 1 within the ionization chamber 3 is increased, the sensitivity is improved. Since the pressure is reduced by using the pump 50, the sample 1 is evaporated at a temperature lower than that in atmospheric pressure. Therefore, the sample 1 can be evaporated by the heating in a level where it is not dissolved, and further power consumption of the heater 17 can also be reduced. In addition, a heating speed may be controlled and a temperature may be raised, for example, at a speed of approximately 50° C. per minute. When a temperature of the sample 1 is raised in stages, substances with different boiling points included in the sample 1 are evaporated at different times. By using the above-described method, even if different substances have the same molecular weight, when their boiling points are different from each other, they can be distinguished and detected.

An introduction tube 4 is a tube made of dielectric such as glass or resin. One end thereof is opened to an atmospheric air and the other end is communicated to the ionization chamber 3 through the ionization chamber wall 16. A wire electrode 5 is passed through the introduction tube 4, and on the other hand an electrode 6 is disposed on the outside of it. An alternating voltage is applied between the wire electrode 5 and the electrode 6 by an AC power supply 49, and dielectric barrier discharge occurs through an air flowing through the introduction tube 4 to thereby generate plasma between both of the electrodes.

Plasma includes electrons and excited molecules and ions generated from components of an air, and spreads into the ionization chamber 3 while being carried by a gas flow. Positions of the wire electrode 5 and the electrode 6 are adjusted so that a plasma component contacting the sample 1 can be changed. The wire electrode 5 further spreads out in a downstream direction of the discharge gas flow with respect to a position of the dielectric barrier discharge region within the introduction tube 4. In the above-described case, high-energy electrons and ions in the plasma are captured by the wire electrode 5 before contacting the sample 1, and low-energy ions and excited molecules contact the sample 1, so that soft ionization can be performed. In the case where the wire electrode 5 fails to spread out in a downstream direction of the discharge gas flow, since high-energy plasma components contact the sample 1, it is easy to be fragmented; however, efficiency that substances with large ionization energy are ionized becomes high. Here, the dielectric barrier discharge based on a combination of the wire electrode 5 and the external electrode 6 will be described as an example. Further, when the introduction tube 4 is configured so as to sandwich a dielectric by one pair of electrodes therebetween, the dielectric barrier discharge can be allowed to occur; therefore, it is not limited to the above-described combination.

A sample gas is ionized by contacting these excited molecules and ions 15, and passes an ion take-out tube 7 and a differential pumping part 8 to thereby be mass-analyzed in a mass analyzer part 48. When an opening of an exhaust tube 10 is installed around the ion take-out tube 7, the generated sample ions flow through the ion take-out tube 7. As a result, a sample ion inflow efficiency to the ion take-out tube 7 is improved, and the sensitivity is improved.

The dielectric barrier discharge region and the ionization chamber 3 are maintained at a pressure of 100 to 10000 Pa by the exhaust of the mass analyzer part 48 connected to the pump 50 and the ion take-out tube 7. The mass analyzer has the following benefit. That is, in the dielectric barrier discharge region and the ionization chamber 3 at a pressure of 500 Pa or less, since the number of reagent ions is generated more than that of sample molecules, the sample molecules are hard to be affected by ion suppression. At a pressure of 1000 Pa or more, since an ion molecular reaction is easy to occur, molecular ions can be detected with high sensitivity. At a pressure of 500 to 1000 Pa, there is brought about an intermediate situation between the two above-described situations. A pressure of the ionization chamber 3 can be measured by installing a vacuum gauge on the ionization chamber 3. Further, the pressure of the ionization chamber 3 can be controlled by using displacement of the pump 50 and that of the mass analyzer part 48 connected to the ion take-out tube 7, and conductance of the introduction tube 4. A pressure of the dielectric barrier discharge region is calculated from the pressure of the ionization chamber 3 and a position of the dielectric barrier discharge region within the introduction tube 4. In the case where an exhaust velocity of the pump 5 is 100 L/min and a capillary having an internal diameter of 0.2 mm and a length of 10 mm is used as the introduction tube 4, for example, the ionization chamber 3 is maintained at a pressure of approximately 500 Pa. When the dielectric barrier discharge region is located nearest to the opening on the side of the ionization chamber 3 of the introduction tube 4, the dielectric barrier discharge region is maintained at a pressure of approximately 500 Pa.

By using the above-described configuration, even if using air as a discharge gas, the discharge can be stably performed and a special discharge gas is not required to be prepared. In addition, this permits the analyzer to improve an introduction efficiency of the generated sample ions to the mass analyzer part 48, and improve the sensitivity.

Second Embodiment

System Configuration Example

Figure 2:
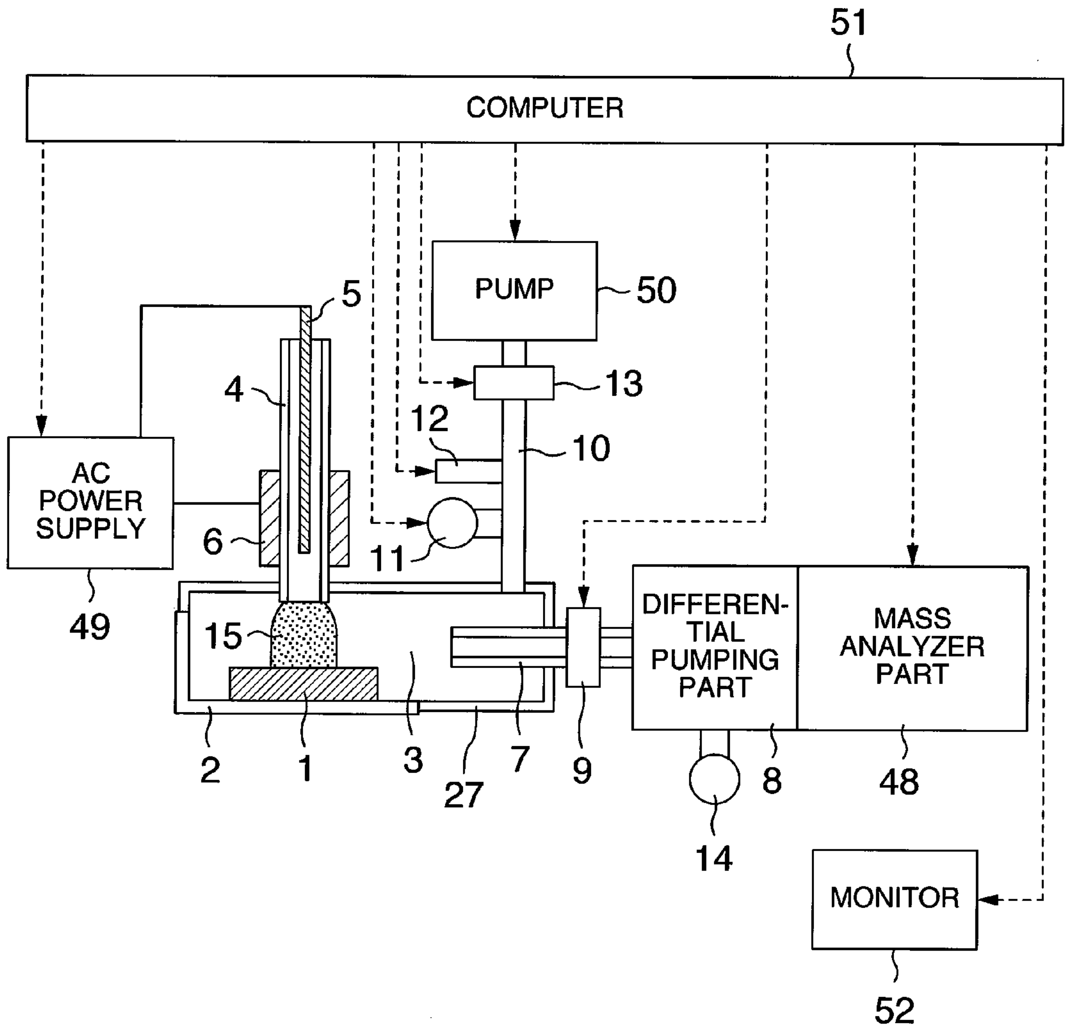
FIG. 2 illustrates one example of a system configuration of a mass analyzer according to a second embodiment of the present invention.

FIG. 2 illustrates one example of a system configuration of a mass analyzer according to a second embodiment of the present invention.

The sample 1 is mounted on the sample stage 2, and introduced to the ionization chamber 3. The sample stage 2 that mounts the sample 1 is, for example, cassette-shaped, and one capable of being inserted into the ionization chamber 3 can be used as the sample stage 2. Any of solid, liquid, a substance adsorbed to solid, and a mixture thereof can be used as the sample 1. In the case of using powders or liquid, it may be put into a dish-like vessel. To the ionization chamber 3, a dielectric barrier discharge device is connected. The dielectric barrier discharge device includes the tube 4 that is made of a dielectric such as glass or polymers and that introduces a dielectric barrier discharge gas into the ionization chamber 3, the wire electrode 5 introduced into the tube 4, the electrode 6 installed outside the tube 4, and the AC power supply 49 that applies an alternating voltage between the wire electrode 5 and the electrode 6. As the dielectric barrier discharge gas, helium, nitrogen, or argon may be used in addition to air. The excited molecules and ions 15 generated by the dielectric barrier discharge device contact and ionize the sample 1. Further, to the ionization chamber 3, the ion take-out tube 7 is connected, and introduces the sample ions generated in the ionization chamber 3 into the differential pumpingdifferential pumping part 8. The ion take-out tube 7 is equipped with an open/close valve 9 that connects or disconnects the ionization chamber 3 and the differential pumpingdifferential pumping part 8. The ionization chamber wall 27, the ion take-out tube 7, and the open/close valve 9 may be heated for suppressing pollution due to the adsorption of the sample gas. Further, to the ionization chamber 3, the pump 50 such as a diaphragm pump or a rotary pump is connected via an exhaust tube 10. To the exhaust tube 10, a vacuum gauge 11 that monitors a degree of vacuum of the ionization chamber 3, a leak valve 12 that controls a pressure of the ionization chamber 3, and the open/close valve 13 that connects or disconnects the ionization chamber 3 and the pump 50 are connected. To the differential pumpingdifferential pumping part 8, a vacuum gauge 14 that monitors the pressure is connected. A part of the sample ions introduced into the differential pumping part 8 are further introduced into the mass analyzer part 48 and mass-analyzed. A computer 51 is connected to the AC power supply 49, the open/close valve 9, the vacuum gauge 11, the leak valve 12, the open/close valve 13, the vacuum valve 14, the pump 50, a monitor 52, and the mass analyzer part 48. Further, the computer 1 monitors measured values and controls an operation of each part. In addition, the sample ions may be measured by using an ion mobility spectrometer in addition to the mass spectrometer.

(Operation Sequence Example)

Next, one example of an operation sequence during an analysis in the analyzer illustrated in FIG. 2 will be described.

(1) In the initial state, the open/close valves 9 and 13, and the leak valve 12 are closed, the AC power supply 49 is turned OFF, and the pump 50 and the mass analyzer part 48 are turned ON.

(2) The computer 51 confirms that the mass analyzer part 48 performs a normal operation and measured values of the vacuum gauge 14 are stabilized in the predetermined pressure range.

(3) The computer 51 opens the leak valve 12 and confirms that the vacuum gauge 11 indicates an atmospheric pressure, and then closes the leak valve 12.

(4) A user draws the sample stage 2, and mounts the sample 1 on it. Then, the user gets back the sample stage 2, and selects a measurement start on the monitor 52.

(5) The computer 51 opens the open/close valve 13, and monitors a measured value of the vacuum gauge 11 while evacuating the ionization chamber 3 by using the pump 50. Then, the computer 51 confirms that the measured value is stabilized in the predetermined pressure range.

(6) The computer 51 opens the open/close valve 9, monitors a measured value of the vacuum gauge 14, and confirms that the measured value is stabilized in the predetermined pressure range. At this time, air flows in the ionization chamber 3 from the introduction tube 4, and the air is exhausted from it through the tubes 10 and 7, and it is maintained at a pressure of approximately 100 to 10000 Pa.

(7) The computer 51 turns ON the AC power supply, and starts the dielectric barrier discharge. The excited molecules and ions 15 generated by the dielectric barrier discharge contact sample vapor generated from the sample 1 or a surface of the sample 1. Then, the generated sample ions pass through the ion take-out tube 7 and the differential pumping part 8, and enter the mass analyzer part 48.

(8) The mass analyzer part 48 acquires mass spectra, and transmits them to the computer 51.

(9) The computer 51 processes data, and displays it on the monitor 52.

(10) When the user selects the measurement end on the monitor 52, the computer 51 turns OFF the AC power supply 49, closes the open/close valves 13 and 9, opens the leak valve 12, and confirms that the vacuum gauge 11 indicates an atmospheric pressure. Then, the computer 51 closes the leak valve 12, and displays on the monitor 52 that the sample can be replaced.

(11) The user draws the sample stage 2, and washes it or replaces it with a new sample stage. When continuously performing the measurement, the process returns to the above-described sequence 4.

In the sequence, when an abnormality is confirmed in a pressure measurement value or an operation of the mass analyzer part 48 and the AC power supply 49, the computer 51 closes the open/close valves 9 and 13, opens the leak valve 12, turns OFF the AC power supply 49, and displays an error on the monitor 52.

The above-described apparatus configuration and operation sequence permit the analyzer to measure a solid or liquid sample at a low pressure. Excited molecules or ions generated by the dielectric barrier discharge contact sample vapor on a sample surface and are ionized, and then introduced into the differential pumping part 8. Therefore, ionization efficiency is high and a loss of the sample ions is reduced. There is no process of heating and evaporating the sample at an atmospheric pressure and introducing it into an ion source, and no sample is lost in the introduction process. For example, a process of introducing a sample gas into an ionization region via piping can be omitted and the sample can also be prevented from being lost due to sample adsorption to the piping. As can be seen from the above sequence, the ionization of solid or liquid samples can be performed with high sensitivity. Further, a spectrum in which fragmentation is reduced is acquired through the ionization using the dielectric barrier discharge, and therefore a plurality of substances can be detected at the same time. Since the dielectric barrier discharge can be operated by using only the AC power supply, the apparatus can be miniaturized.

Third Embodiment

Direction of Discharge Tube

Figure 3:
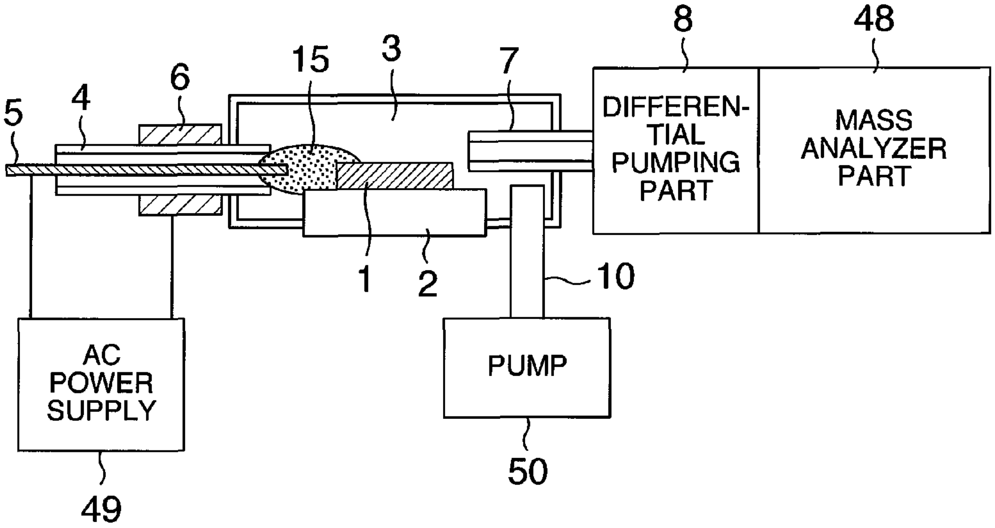
FIG. 3 illustrates a configuration example of a mass analyzer according to a third embodiment of the present invention.

FIG. 3 illustrates one configuration example of a mass analyzer according to a third embodiment of the present invention.

The sample 1 is mounted on the sample stage 2. A height of the sample stage 2 can be adjusted, and a positional relationship between the sample 1 and each of the introduction tube 4, the ion take-out tube 7, and the exhaust tube 10 can be adjusted. The introduction tube 4 and both of the ion take-out tube 7 and the exhaust tube 10 are disposed so as to sandwich the sample 1 therebetween. The introduction tube 4 may be disposed in parallel with or at a predetermined angle with respect to a top surface of the sample stage 2. The above-described configuration permits the analyzer to efficiently cover a sample surface with the excited molecules and ions generated by the dielectric barrier discharge, improve the ionization efficiency, and further improve the sensitivity.

Fourth Embodiment

Usage of SPME

Figure 4:
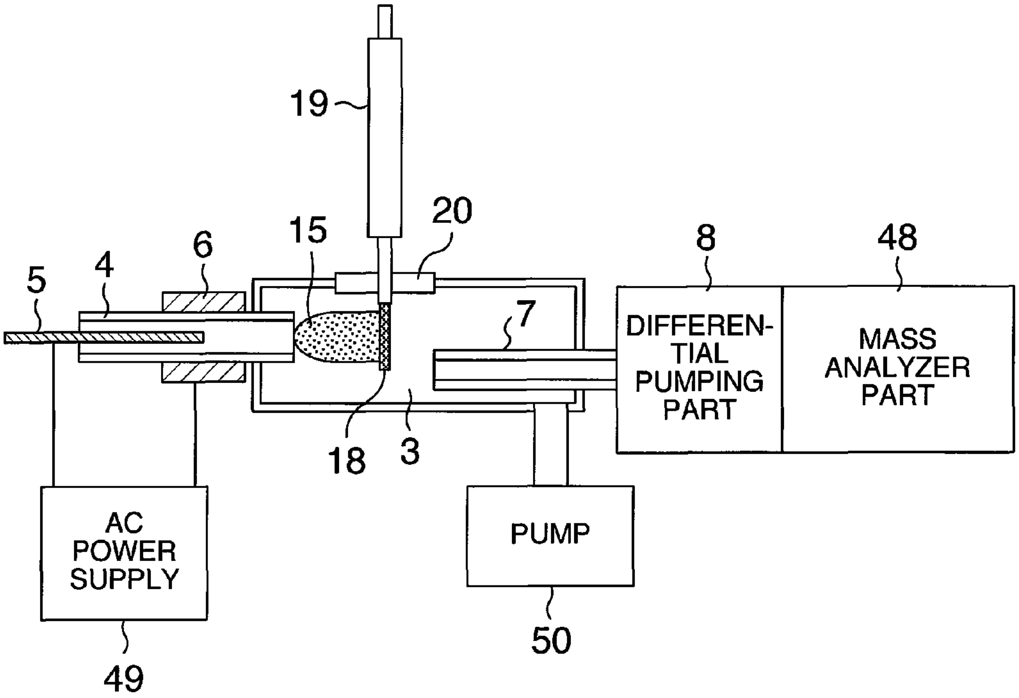
FIG. 4 illustrates a configuration example of a mass analyzer according to a fourth embodiment of the present invention.

FIG. 4 illustrates one configuration example of a mass analyzer according to a fourth embodiment of the present invention.

As a method for extracting an objective substance from gas or liquid, a method referred to as a solid phase microextraction (SPME) is known. In the SPME, an objective substance is extracted by the use of distribution or adsorption to a solid phase extractant applied to a fiber. An edge of a holder 19 is put into the ionization chamber 3 through a septum 20 in the state of housing this SPME fiber 18 into the holder 19, and then the fiber 18 is exposed. The fiber 18 is exposed by the excited molecules and ions 15 generated by the dielectric barrier discharge, and as a result a sample is ionized. The above-described configuration permits the analyzer to measure also the sample collected by the SPME with high sensitivity by using the ionization in the dielectric barrier discharge.

Fifth Embodiment

Heating by Heating Wire

Figure 5:
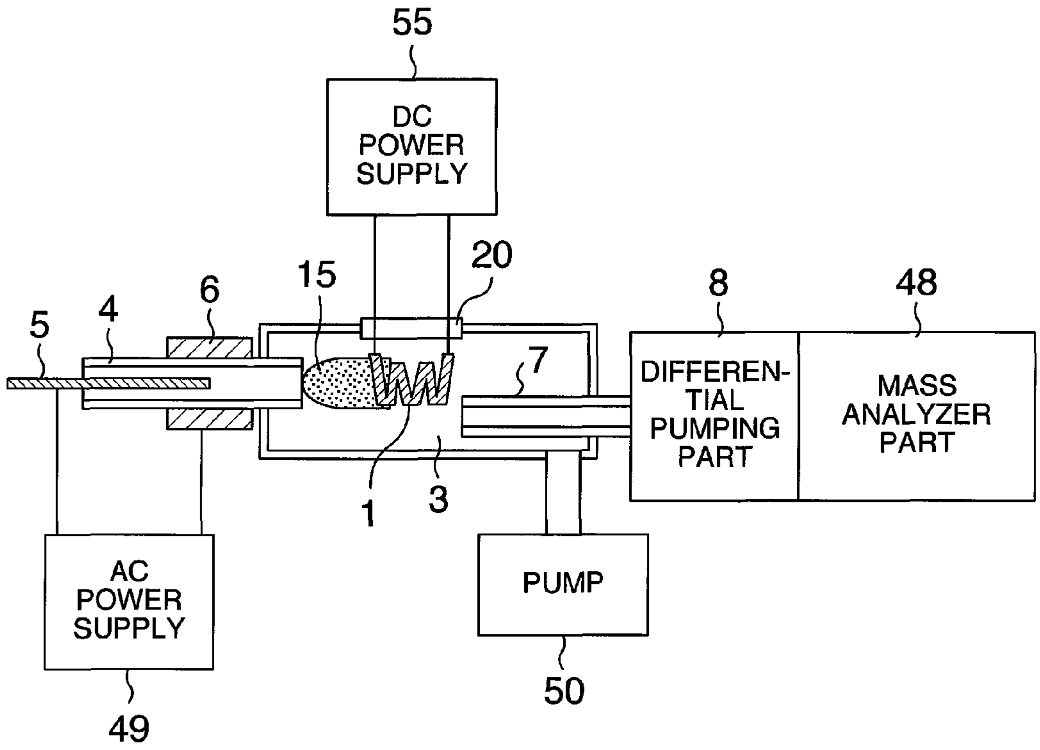
FIG. 5 illustrates a configuration example of a mass analyzer according to a fifth embodiment of the present invention.

FIG. 5 illustrates one configuration example of a mass analyzer according to a fifth embodiment of the present invention.

The sample 1 is fixed on a surface of a heating wire. There can be used, for example, one sample obtained from dissolving a solid sample in a solvent to apply its solution to a heating wire surface, and then evaporating the solution to dry the heating wire surface; another sample obtained from applying a liquid sample with high viscosity to a heating wire surface; and another sample obtained from previously applying a solid phase extractant to a heating wire surface and extracting a sample to it. Two conducting wires are routed from both ends of the heating wire to the outside of the ionization chamber 3 through the septum 20, and are connected to a DC power supply 55. The sample 1 is exposed by the excited molecules and ions 15 generated by the dielectric barrier discharge, and it is ionized. At this time, a current is supplied to the heating wire so that the sample on a heating wire surface can be heated and vaporization of the sample can be promoted. The above-described configuration permits the mass analyzer to heat the sample at low power. When raising up a current in stages, a sample temperature can be stepwise raised up. When the sample temperature is stepwise raised up, substances with different boiling points included in the sample are evaporated at different times. The above-described method permits the analyzer to distinguish and detect different substances when their boiling points are different from each other even if they have the same molecular weight.

Sixth Embodiment

Method of Sampling from Solution

Figure 6:
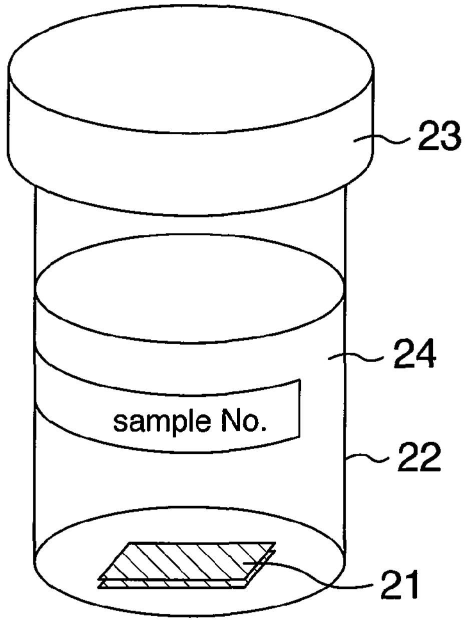
FIG. 6 illustrates a method using a solid phase extraction as one example of a method for preparing a sample to be introduced into a mass analyzer according to a sixth embodiment of the present invention.

FIG. 6 illustrates a method using a solid phase extraction as one example of a method for preparing a sample to be introduced into a mass analyzer according to a sixth embodiment of the present invention.

As a measuring object, the above-described method can be applied to contamination monitoring for water and soil, an agricultural chemical detection of an extraction liquid from foods, a detection for metabolic substances or chemical drugs in bio-samples such as blood, urine, and spit.

A solution sample 24 is put into a vessel 22 made of glass, plastics, or metal. The solid phase extractant 21 is immersed in a solution sample 24, and a lid 23 is closed. At this time, when stirring the solution sample 24 by shaking the vessel 22, stirring it using a stirrer, or emitting ultrasonic sounds, the extraction time can be shortened. When an internal standard material is added to the sample solution 24, the quantitative property of analysis can be improved. Further, according to a nature of the sample to be extracted, an acid or alkali is added to the solution sample 24, a buffer solution is added to it to adjust a liquid property, salt is added to it, or an organic solvent is added to it. This process permits an affinity between the objective substance and the solid phase extractant to be increased, and the extraction efficiency to be improved. The internal standard substance and substances such as acid, alkali, buffering agent, salt, and organic solvent may be previously measured and put into the vessel 22. As the solid phase extractant 21, there can be used a resin such as silicone and polyacrylate; ion-exchange resin, silica, alumina, and metal; agents obtained by applying a chemical modification to their surfaces; agents obtained by immobilizing an antibody; and porous agents.

After the extraction during period of time, while the solid phase extractant 21 is left in the vessel 22, the solution sample 24 is thrown out, a cleaning solvent is put into the vessel 22 in place of it, and the solid phase extractant 21 is rinsed out. The cleaning solvent is thrown out, the solid phase extractant 21 is taken out by using a pincette, and is mounted on the sample stage 21 of FIG. 1 to measure it. The above-described sample preparation method permits the analyzer to concentrate the objective substance in the solution sample into the solid phase extractant 21 and introduce the objective substance into itself, and improve the sensitivity.

Seventh Embodiment

Method 2 of Sampling from Solution

Figure 7:
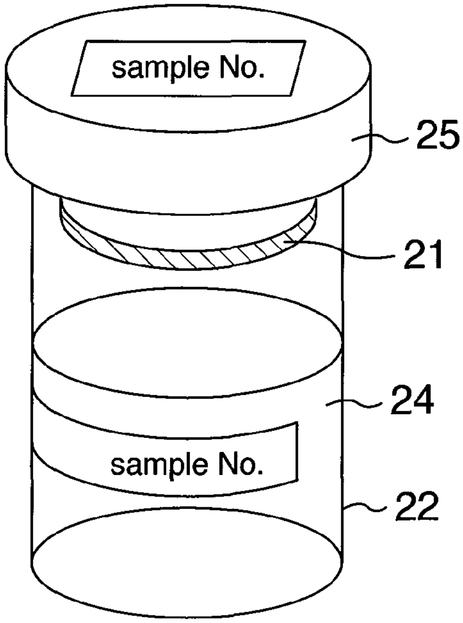
FIG. 7 illustrates a method using a solid phase extraction as one example of a method for preparing a sample to be introduced into a mass analyzer according to a seventh embodiment of the present invention.

FIG. 7 illustrates a method using a solid phase extraction as one example of a method for preparing a sample to be introduced into a mass analyzer according to a seventh embodiment of the present invention.

The solution sample 24 is put into the vessel 22 made of glass, plastics, or metal, and a lid 25 is closed. The solid phase extractant 21 is previously fixed on the lid 25 and exposed to a head space gas over the solution sample 24, and extracts the objective substance in the head space gas. Or, alternatively, after the solution sample 24 is put into the vessel 22 and the lid 25 is closed, the objective substance can also be directly extracted from the solution sample 24 by inverting the vessel 22. The same sample label is stuck on the vessel 22 and the lid 25 so that mix-up of the sample can be prevented. After the extraction during period of time, the lid 25 is opened, and the solid phase extractant 21 is taken out by using a pincette and mounted on the sample stage 2 of FIG. 1 for measurement. The above-described sample preparation method permits the analyzer to simply concentrate the objective substance in the head space gas over the solution sample into the solid phase extractant 21, and introduce the objective substance into itself.

Eighth Embodiment

Sample Introduction Part to which Lid for Sampling can be Directly Attached

Figure 8:
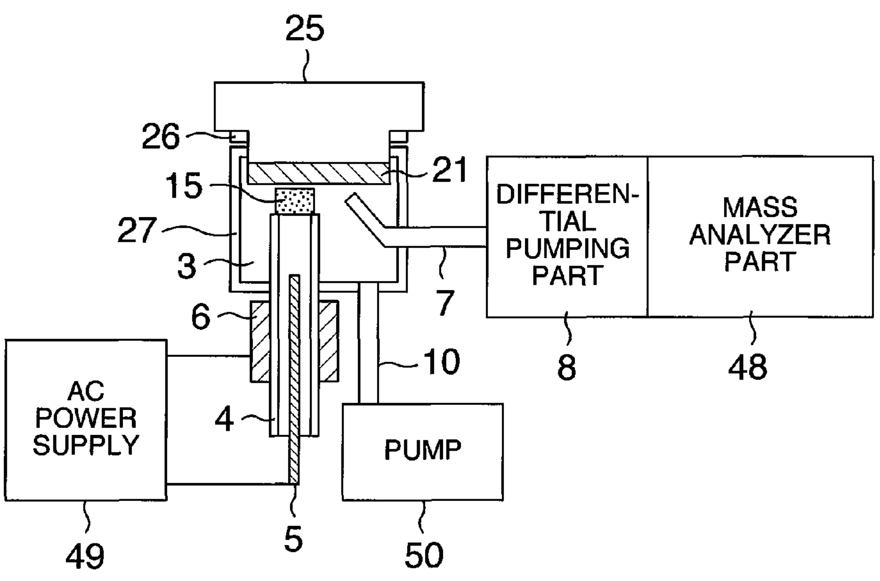
FIG. 8 illustrates a configuration example of a mass analyzer according to an eighth embodiment of the present invention.

FIG. 8 illustrates one configuration example of a mass analyzer for measuring a sample acquired by a solid phase extraction method illustrated in FIG. 7.

Figure 9:
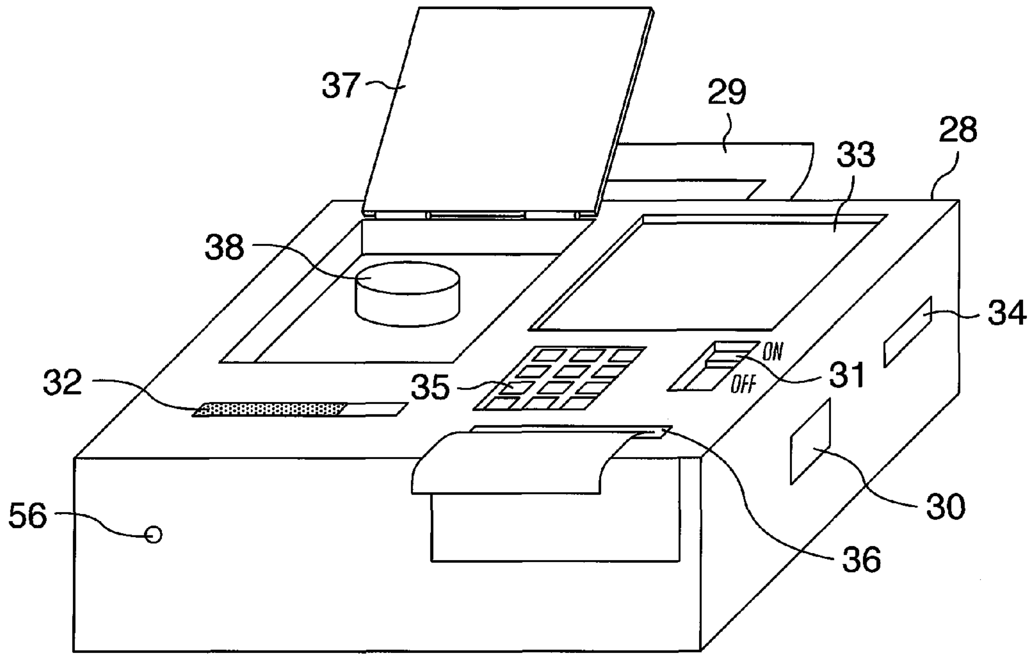
FIG. 9 illustrates an appearance example of a portable analyzer in which the mass analyzer configuration according to the eighth embodiment of the present invention.

The ionization chamber wall 27 is cylindrical, and a screw part that screws the lid 25 of FIG. 7 is formed on a top surface. After the sample extraction, the cover is directly attached to the ionization chamber 3 so that the sample can be installed in the ionization chamber 3. A packing 26 is interposed between the ionization chamber wall 27 and the lid 25, and an air tight characteristic of the ionization chamber 3 is maintained. An opening of the ion take-out tube 7 is installed on a portion in which sample ions are introduced most effectively by bending it. FIG. 9 illustrates one example of an appearance of a portable analyzer into which a mass analyzer configuration of FIG. 8 is integrated. An apparatus chassis 28 includes a charging power source connecting port 30, a power supply switch 31, a battery residual capacity display 32, a screen 33, a personal computer connector 34, a numeric keypad 35, a printing paper ejection opening 36, an inside cover 37, and a sample introducing opening lid 38. Further, the apparatus chassis 28 is equipped with a handle 29, and can be carried about. One example of a screen display in the case of performing a drug testing is illustrated in FIG. 10.

Figure 10A:
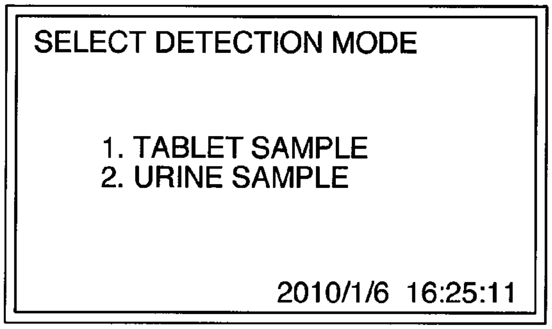
FIGS. 10A to 10E illustrate screen display examples of the mass analyzer according to the eighth embodiment of the present invention.

As illustrated in FIG. 10A, options for measurement conditions are displayed on the screen 33. The user selects the measurement conditions by a touch panel operation or the numeric keypad 35.

Figure 10B:
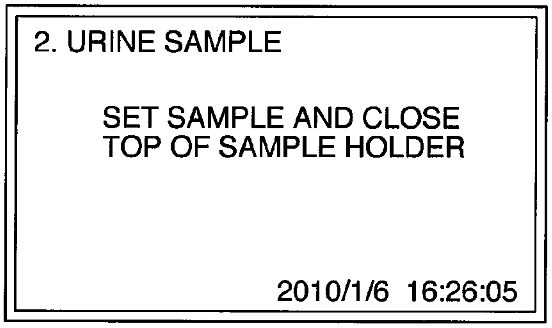

As illustrated in FIG. 10B, the user is instructed to introduce a sample. In the apparatus illustrated in FIG. 9, when opening the inside cover 37, an interlock is operated, the AC power supply 49 is turned OFF, and the pressure in the ionization chamber 3 reaches an atmospheric pressure. The sample introducing opening lid 38 is detached from the ionization chamber 3, and the lid 25 after the sample extraction is screwed to the screw part and attached to the ionization chamber 3. When closing the inside cover 37, the interlock is released and the mass analyzer can measure the sample. The user selects the measurement start according to the display of the screen 33.

Figure 10C:
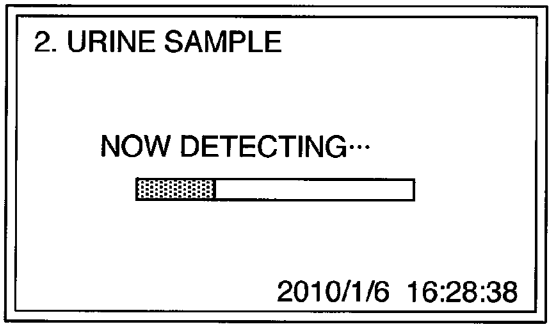

As illustrated in FIG. 10C, a measurement progress rate is displayed on the screen 33 during the measurement. During this time, the inside cover 37 is locked and cannot be opened. As a dielectric barrier discharge gas, air is introduced through a filter from an extracting gas inlet 56. When using other gases except air as a discharge gas, piping from a gas container is connected to the extracting gas inlet 56 to thereby introduce a gas.

Figure 10D:
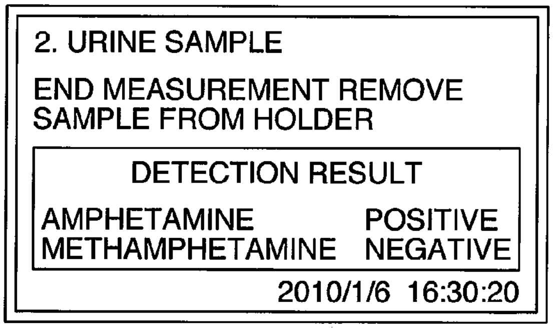

When finishing the measurement, a display of the finish and results are displayed on the screen 33 as illustrated in FIG. 10D. In addition to the measurement results and the time, if necessary, a measuring person name and a sample name are printed on a paper to be ejected from the printing paper ejection opening 36. Spectra measured by the mass analyzer, determination results of the inspection, the measurement time, and the other parameters are stored in the computer within the mass analyzer.

Figure 10E:
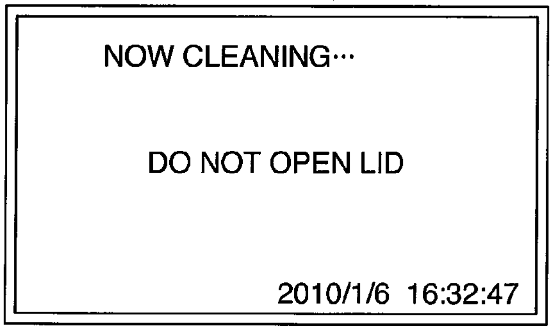

After the sample measurement, the lid 25 is detached from the ionization chamber 3 and the sample introducing opening lid 38 is attached thereto. The measurement is performed in the same manner as in the sample measurement, and whether pollution due to sample residuals is present determined. When confirming that the pollution is present, a cleaning operation is performed and a cleaning performance is displayed on the screen 33 as illustrated in FIG. 10E. As the cleaning operation, the ionization chamber wall 27, introduction tube 4, and ion take-out tube 7 in FIG. 8 are heated, or rinsed out by using a cleaning solvent. When performing take-out of the measurement data, a parameter setting change of the mass analyzer, and a change in the analysis software, a personal computer is connected to the personal computer connector 34 to thereby perform an operation. The above-described apparatus configuration permits the analyzer to simply measure a solid phase extracted sample with high sensitivity.

Ninth Embodiment

Dielectric Barrier Discharge by Sandwiching Sample

Figure 11A:
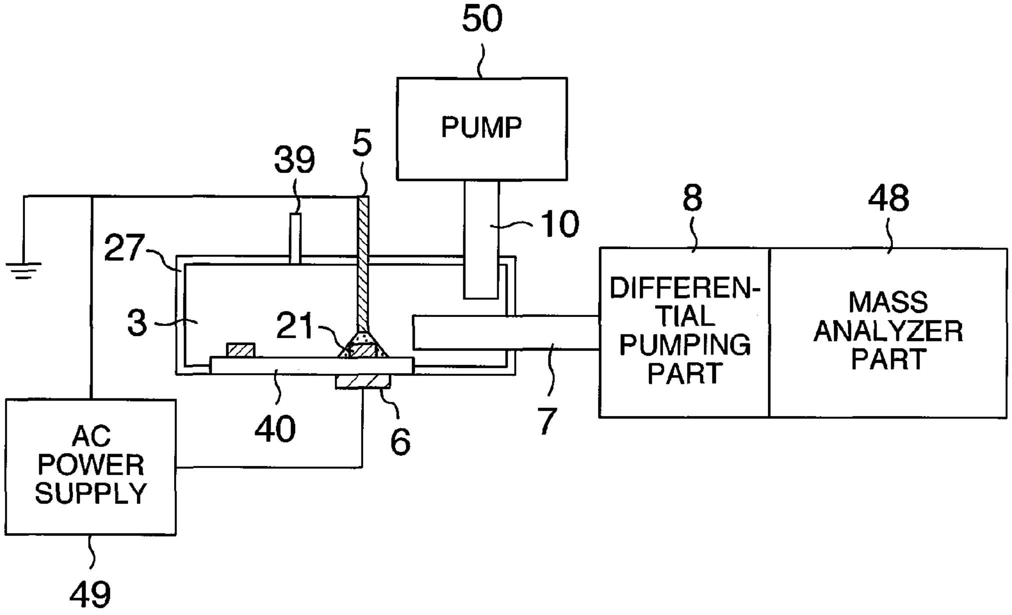
FIGS. 11A and 11B illustrate a configuration example of a mass analyzer according to a ninth embodiment of the present invention.

FIG. 11A illustrates one configuration example of a mass analyzer according to a ninth embodiment of the present invention.

An air introducing port 39 is provided on the ionization chamber wall 27 and introduces air into the ionization chamber 3. An inlet flow of air can be controlled depending on an internal diameter and length of the air introducing port 39. Or, a valve may be provided on the air introducing port 39. In addition, on the ionization chamber wall 27, the exhaust tube 10 and the ion take-out tube 7 are provided, and the pressure is reduced within the ionization chamber 3. A plurality of samples can be mounted on a sample stage 40. As one example, a plurality of types of solid phase extractants may be fixed on the sample stage 40, this sample stage 40 may be immersed in a solution sample, and different substances may be extracted into respective solid phase extractants. The solid phase extractant is located between the electrode 6 installed on a bottom surface of the sample stage 40 and the wire electrode 5 installed on a top surface of the sample stage 40. The material of the sample stage 40 and the solid phase extractant 21 is dielectric. When an alternating voltage is applied between the electrode 6 and the wire electrode 5, the dielectric barrier discharge occurs while sandwiching the solid phase extractant 21 therebetween, and the samples held by the solid phase extractant 21 are ionized by the generated excited molecules and ions 15. The above-described configuration permits the analyzer to generate excited molecules and ions in a space approximated to the samples, and improve the ionization efficiency of the samples and further improve the sensitivity of them.

Figure 11B:
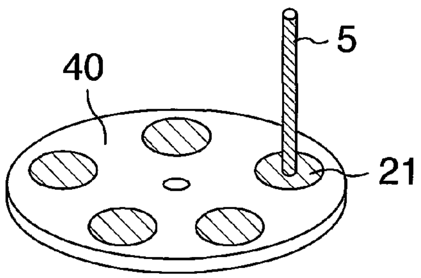

As one example, as illustrated in FIG. 11B, the sample stage 40 is circular and can be rotated by using a center as an axis, and further respective samples can be moved between the electrodes. The above-described configuration permits the analyzer to locally apply excited molecules or ions to samples, and separately analyze a plurality of types of samples without being ionized simultaneously even if they are mounted on the same sample stage.

Tenth Embodiment

Figure 12:
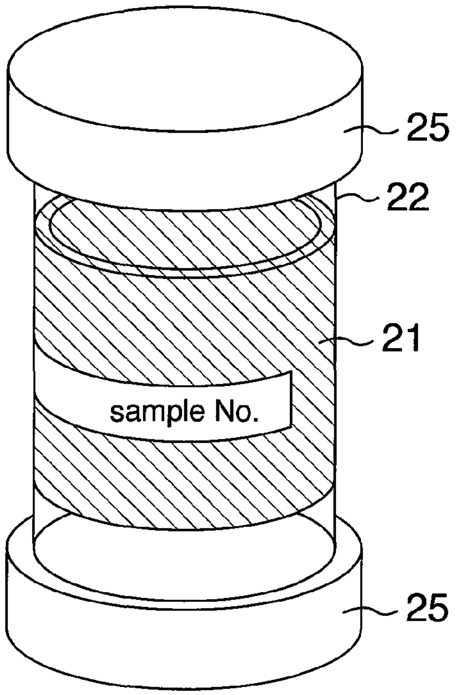
FIG. 12 illustrates a method using a solid phase extraction as one example of a method for preparing a sample introduced into a mass analyzer according to a tenth embodiment of the present invention.

Method 3 of Sampling from Solution/Solid Phase Extractant in the Inside of Cylinder FIG. 12 illustrates a method using a solid phase extraction as one example of a method for preparing samples introduced into a mass analyzer according to a tenth embodiment of the present invention.

The solid phase extractant 21 is fixed on an internal wall of the cylindrical vessel 22 made of glass, plastics, or metal. To this vessel 22, a sample solution is passed. The sample solution is passed more than once, and the extraction amount of an objective substance can also be improved. Or, the vessel 22 has a structure in which the lids 25 are attached to both its openings and it can be sealed. Further, the sample solution is put into the vessel 22 and stirred, and after the extraction for a given length of time, the lid 25 is opened and the sample solution is thrown out. Next, a cleaning solvent is passed to remove the sample solution left on a surface of the solid phase extractant 21 or an internal wall of the vessel 22.

Figure 13:
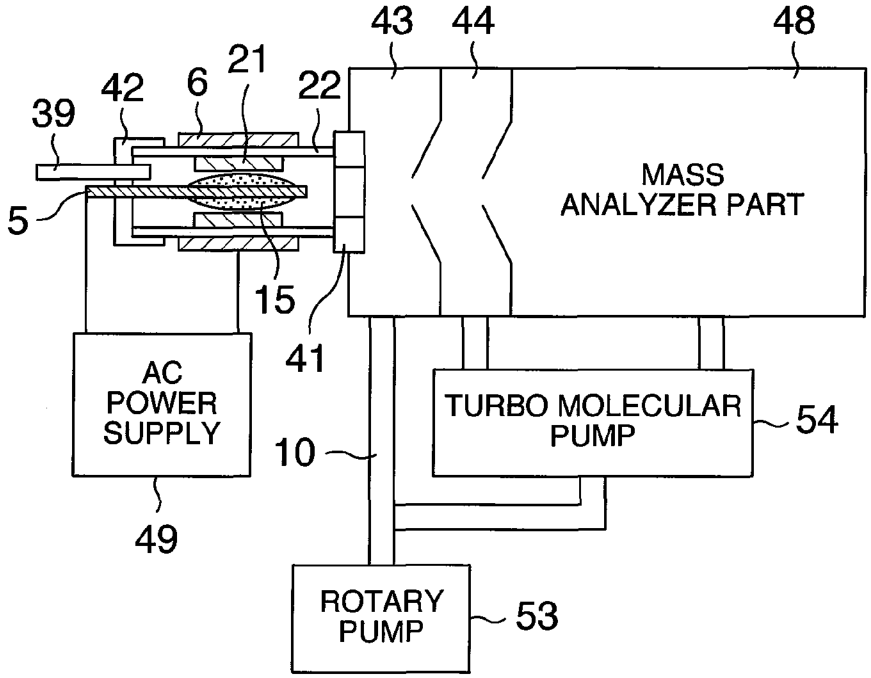
FIG. 13 illustrates a configuration example of the mass analyzer capable of attaching a vessel and measuring a sample.

FIG. 13 illustrates one example of the mass analyzer capable of attaching the vessel 22 in FIG. 12 and measuring the sample. One opening of the vessel 22 is connected to a valve 41. To the other opening, the wire electrode 5 and a lid 42 with the air introducing port 39 are connected. The electrode is fixed around the vessel 22. When opening the valve 41, the pressure is reduced within the vessel 22 and the region in which the dielectric barrier discharge occurs is maintained at any value of the pressure of 100 to 10000 Pa. When applying an alternating voltage between the wire electrode 5 and the electrode 6, the dielectric barrier discharge occurs while sandwiching the solid phase extractant 21 therebetween, and substances held by the extractant 21 are ionized. Further, the substances pass through the valve, a first differential pumping chamber 43, and a second differential pumping chamber 44, and enter the mass analyzer part 48, thereby acquiring spectra.

By using the above-described sample preparation method and apparatus configuration, since the extraction and measurement can be performed by the solid phase extractant having a wide area, shortening of the extraction time and improvement in the sensitivity due to improvement in the extraction amount can be realized. Further, the mass analyzer has a structure in which the dielectric part and the solid phase extractant are integrated and can be simply replaced in each measurement, and therefore can prevent the measurement sensitivity from being reduced due to pollution of tube walls or vessel wall in the region in which the dielectric barrier discharge occurs and in the region in which the samples are disposed.

Eleventh Embodiment

Method 4 of Sampling from Solution/Porous Solid Phase Extractant

Figure 14:
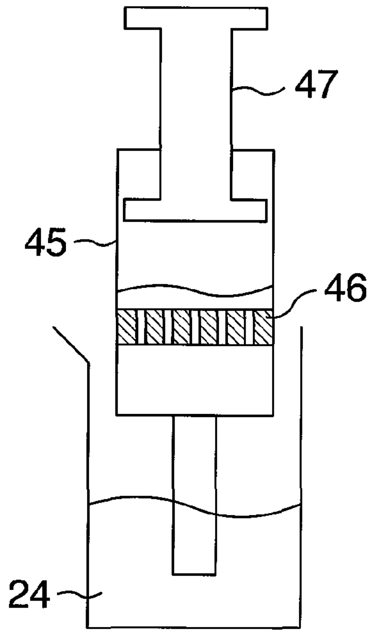
FIG. 14 illustrates a method using a solid phase extractant as one example of a method for preparing a sample introduced into a mass analyzer according to an eleventh embodiment of the present invention.

FIG. 14 illustrates a method using a solid phase extraction as one example of a method for preparing samples introduced into a mass analyzer according to an eleventh embodiment of the present invention.

The solid phase extractant 46 with holes is fixed in the inside of a syringe cylinder 45 made of dielectric such as glass or plastics. Examples of the above-described solid phase extractant include a membrane filter, solid phase beads such as filled silica or resin, a polymer with a monolithic structure, a porous silicone, an agent obtained by applying a chemical modification to their surfaces, and a mixture thereof. In this syringe cylinder 45, the sample solution 24 is sucked by cocking a plunger 47 and passed through the solid phase extractant 46. Then, the sample solution 24 is ejected by pushing the plunger 47. The sample solution 24 is passed more than once so that the extraction amount of objective substances can also be improved. Next, a clearing solvent such as water, a buffer solution, a detergent liquid, or an organic solvent is passed to remove the solution sample left on an internal wall of the solid phase extractant 46 or syringe cylinder 45. Next, air is passed to remove a liquid left in a cavity of the solid phase extractant 46. As a sample, a vapor or fine particles may be used. In the above-described sample preparation method, a surface area of the solid phase extractant 46 is large and the sample efficiently contacts it, thereby shortening the extraction time. In addition, simple samples can be concentrated.

Figure 15:
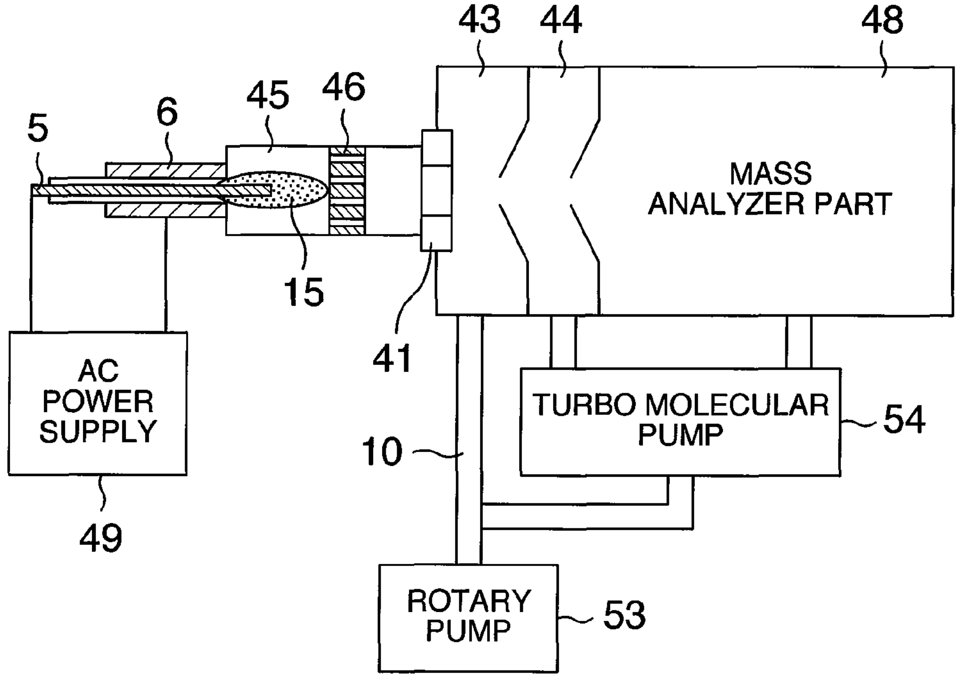
FIG. 15 illustrates one example of the mass analyzer capable of attaching a syringe cylinder and measuring a sample.

FIG. 15 illustrates one example of the mass analyzer capable of attaching the syringe cylinder 45 of FIG. 14 to the mass analyzer part 48 and measuring the sample. The opening of the syringe cylinder 45 is connected to the open/close valve 41. The wire electrode 5 is fixed on an edge of the syringe cylinder 45 and the electrode 6 is fixed around an edge portion of it. When opening the open/close valve 41, the pressure is reduced within the syringe cylinder 45 and is maintained at any value of the pressure of approximately 100 to 10000 Pa. Air flows in from the edge of the syringe cylinder 45. When applying an alternating voltage between the wire electrode 5 and the electrode 6, the dielectric barrier discharge occurs, the excited molecules or ions 15 are generated, and then pass through cavities of the solid phase extractant 46. At this time, substances held by the solid phase extractant 46 are ionized.

Further, the generated sample ions pass through the open/close valve 41, the first differential pumping chamber 43, and the second differential pumping chamber 44, and enter the mass analyzer part 48, thereby acquiring spectra.

According to the above-described apparatus configuration, all the excited molecules and ions generated by the dielectric barrier discharge pass through a surface of the solid phase extractant, and further ionize samples from the solid phase extractant having a wide area. This process permits the proposed mass analyzer to improve the ionization efficiency and further the sensitivity.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An analyzer comprising:

an ionization chamber including a dielectric barrier discharge part, a gas introduction opening to introduce a gas used for dielectric barrier discharge, a sample mounting part to mount a sample ionized by a plasma component generated by the dielectric barrier discharge, an ion take-out opening to take out the ionized sample, and a gas exhaust;

an exhauster to exhaust air in the ionization chamber from the gas exhaust to cause the ionization chamber to have a pressure lower than an atmospheric pressure; and an analyzer part to analyze the sample taken out from the ion take-out opening.

2. The analyzer according to claim 1, wherein:

the dielectric barrier discharge part includes a first electrode, a second electrode, a dielectric part provided between the first and second electrodes, and a power supply to apply an alternating voltage to any one of the first and second electrodes and generate discharge between the first and second electrodes; and the dielectric barrier discharge is performed at a pressure of 100 Pa or more to 10000 Pa or less.

3. The analyzer according to claim 2, wherein the dielectric barrier discharge is performed at a pressure of 500 Pa or more.

4. The analyzer according to claim 2, wherein the dielectric barrier discharge is performed at a pressure of 1000 Pa or more.

5. The analyzer according to claim 1, wherein as the analyzer part, a mass spectrometer or ion mobility spectrometer is used.

6. The analyzer according to claim 2, wherein:

the dielectric part of the dielectric barrier discharge part is cylindrical; and one end of a cylinder is the gas introduction opening, and another end is provided within the ionization chamber.

7. The analyzer according to claim 2, wherein the sample mounting part is the dielectric part of the dielectric barrier discharge part.

8. The analyzer according to claim 2, wherein:

the sample mounting part includes portions that mount a plurality of samples on concentric circles and a rotational mechanism of the sample mounting part; and at least one of the portions that mount the plurality of samples is disposed between the first and second electrodes.

9. The analyzer according to claim 1, wherein the sample mounting part includes a heating part that heats a sample to be mounted.

10. The analyzer according to claim 9, wherein the heating part raises up a temperature in stages.

11. The analyzer according to claim 1, wherein:

the sample mounting part is a detachable cassette-shaped, and is attached to the ionization chamber.

12. The analyzer according to claim 1, wherein the ionization chamber includes the ion take-out opening near the gas exhaust.

13. The analyzer according to claim 1, wherein the gas introduction opening, and the ion take-out opening and the gas exhaust are provided sandwiching the sample mounting part therebetween.

14. The analyzer according to claim 1, wherein the sample is held by a solid phase extractant.

15. The analyzer according to claim 1, wherein the sample is held by a heating wire.

16. An ionization apparatus comprising:

an ionization chamber including a dielectric barrier discharge part, a gas introduction opening to introduce a gas used for dielectric barrier discharge, a sample mounting part to mount a sample ionized by a plasma component generated by the dielectric barrier discharge, an ion take-out opening to take out the ionized sample, and a gas exhaust; and an exhauster to exhaust air in the ionization chamber from the gas exhaust to cause the ionization chamber to have a pressure lower than an atmospheric pressure.

17. The ionization apparatus according to claim 16, wherein:

the dielectric barrier discharge part includes a first electrode, a second electrode, a dielectric part provided between the first and second electrodes, and a power supply to apply an alternating voltage to any one of the first and second electrodes and generate discharge between the first and second electrodes; and the dielectric barrier discharge is performed at a pressure of 100 Pa or more to 10000 Pa or less.

18. An ionization analyzing method comprising the steps of:

introducing a sample into a vessel including a solid phase extractant;

extracting the sample into the solid phase extractant;

mounting the solid phase extractant having extracted thereinto the sample on an ionization chamber including a dielectric barrier discharge part and an ion take-out opening;

exhausting air in the ionization chamber, applying an alternating voltage to an electrode of the dielectric barrier discharge part, and ionizing the sample by the dielectric barrier discharge; and analyzing an ion taken out from the ion take-out opening.

19. The ionization analyzing method according to claim 18, wherein air in the ionization chamber is exhausted to a pressure of 100 Pa or more to 10000 Pa or less.

20. The ionization analyzing method according to claim 18, wherein:

the solid phase extractant is included in a lid of the vessel; and when the lid of the vessel is inserted into the ionization chamber, and the ionization chamber is sealed, the solid phase extractant is mounted.

21. The ionization analyzing method according to claim 18, wherein:

the solid phase extractant is fitted to an internal wall of the vessel; and when an opening of the vessel is inserted into the dielectric barrier discharge part and the ion take-out opening, the vessel functions as the ionization chamber.

22. The ionization analyzing method according to claim 18, wherein:

the vessel has a shape of a syringe; and when being repeatedly sucked and ejected, the sample is extracted into the solid phase extractant.

23. The ionization analyzing method according to claim 18, wherein:

a valve is provided between the opening of the vessel and the ion take-out opening; and when the valve is opened, air in the vessel is exhausted.

24. A measuring apparatus comprising:

a sample mounting part;

a dielectric barrier discharge part to ionize a sample to be mounted;

an opening to introduce a gas used for dielectric barrier discharge;

a measuring part to measure a sample ionized by the dielectric barrier discharge;

an exhaust part to exhaust air so as to perform the dielectric barrier discharge at a pressure lower than an atmospheric pressure;

an input part to input an operation for measurement;

a controller to control the measurement based on an input to the input part; and a display part to output a measurement state by the measuring part.

25. The measuring apparatus according to claim 24, wherein:

the sample mounting part includes an inside cover; and when the inside cover is opened or closed, operations of the dielectric barrier discharge part and the exhaust part are controlled.

26. The measuring apparatus according to claim 24, wherein the sample mounting part inserts a member including a solid phase extractant into which a sample is solid phase extracted and mounts the sample.

* * * * *